(12) United States Patent
Zealey et al.

(10) Patent No.: US 9,426,087 B2
(45) Date of Patent: Aug. 23, 2016

(54) REDUCED SYSTEM LATENCY FOR DOMINANT SPEAKER

(71) Applicant: DOLBY LABORATORIES LICENSING CORPORATION, San Francisco, CA (US)

(72) Inventors: James Zealey, Dapto (AU); Brendon Costa, Coniston (AU); Glenn N. Dickins, Como (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/406,800

(22) PCT Filed: Jun. 20, 2013

(86) PCT No.: PCT/US2013/046836
§ 371 (c)(1),
(2) Date: Dec. 10, 2014

(87) PCT Pub. No.: WO2014/004259
PCT Pub. Date: Jan. 3, 2014

(65) Prior Publication Data
US 2015/0172202 A1    Jun. 18, 2015

Related U.S. Application Data

(60) Provisional application No. 61/665,334, filed on Jun. 28, 2012.

(51) Int. Cl.
*H04N 7/15*    (2006.01)
*H04L 12/865*    (2013.01)
*H04L 29/06*    (2006.01)

(52) U.S. Cl.
CPC .......... *H04L 47/6275* (2013.01); *H04L 65/403* (2013.01); *H04L 65/80* (2013.01); *H04N 7/15* (2013.01)

(58) Field of Classification Search
CPC ... H04L 65/403; H04L 47/6275; H04L 65/80; H04L 65/607; H04L 29/06027; H04N 7/15; H04N 7/152; H04N 7/14; H04N 7/141; H04N 7/142; H04M 3/56; H04M 3/568; H04M 3/569
USPC ........................ 348/14.01–14.16; 379/202.01
See application file for complete search history.

(56) References Cited

U.S. PATENT DOCUMENTS

| 6,721,280 B1 | 4/2004 | Mauro |
| 6,940,826 B1 | 9/2005 | Simard |

(Continued)

FOREIGN PATENT DOCUMENTS

| WO | 00/14938 | 3/2000 |
| WO | 2005/036878 | 4/2005 |
| WO | 2008/147272 | 12/2008 |

OTHER PUBLICATIONS

ITU-T G.114 "One-Way Transmission Time" May 2003.

(Continued)

*Primary Examiner* — Melur Ramakrishnaiah (57) ABSTRACT

Digital media communication systems and methods are disclosed in which a set of end points and/or clients are in communication with a set of servers. The system is capable of determining which end point is a dominant user and/or speaker. When the system determines that an end point is dominant, then the digital data that emanates from dominant end point is preferred. Such preferred digital data may be forwarded asynchronously and possible ahead of digital data from other, non-dominant end points. Synchronous and/or substantially contemporaneous digital data from other end points may be mixed that such that, when rendered, gives substantially the same effect real life superposition of signals. The system may also toggle on or off between states of asynchronous forward and synchronous-only modes.

18 Claims, 9 Drawing Sheets

(56) References Cited

U.S. PATENT DOCUMENTS

| | | |
|---|---|---|
| 7,042,891 B2 | 5/2006 | Oberman |
| 2001/0000455 A1* | 4/2001 | Chao .............................. 370/316 |
| 2002/0181686 A1* | 12/2002 | Howard et al. .......... 379/202.01 |
| 2003/0152093 A1* | 8/2003 | Gupta et al. .................. 370/412 |
| 2007/0247470 A1 | 10/2007 | Dhuey |
| 2008/0095105 A1 | 4/2008 | Sundberg |
| 2009/0029692 A1 | 1/2009 | Radermacher |
| 2009/0158005 A1 | 6/2009 | Carmichael |
| 2010/0166062 A1 | 7/2010 | Perlman |
| 2010/0325209 A1 | 12/2010 | Thapa |
| 2012/0106347 A1* | 5/2012 | Allan et al. ................... 370/238 |

OTHER PUBLICATIONS

"Difference Between Bandwidth and Speed" http://www.differencebetween.net/technology/internet/difference-between-bandwidth-and-speed/.

* cited by examiner

REDUCED SYSTEM LATENCY FOR DOMINANT SPEAKER

CROSS-REFERENCE TO RELATED APPLICATION

This application claims priority to U.S. Provisional Patent Application No. 61/665,334 file 28 Jun. 2012, which is hereby incorporated by reference in its entirety.

TECHNICAL FIELD

The present invention relates to digital media systems and, more particularly, to digital media (e.g. audio, video or the like) systems having data processing that mitigates signal latency.

BACKGROUND

In voice conferencing systems, where the transport of audio or voice is mediated other than by a direct proximate acoustic coupling, the participants may experience an increased delay in round trip communication. Typically, in telecommunication systems, this can be of the order of 200-500 ms in each direction, what is known as 'mouth-to-ear' delay. This is known to have an impact on communications and functional use of such systems. ITU (ITU-T G.114 2003) sets out details of the observed impact, under different functional activities, of increased link latency. Even in simple one-to-one mediated conversations, the latency can have a substantial impact. In some cases, where long distance or adverse network conditions are experienced, typical latencies can exceed the critical threshold of 400 ms set out in (ITU-T G.114 2003).

For example, when using an IP network, typical latencies across the Atlantic network are 200 ms (http://www.verizon-business.com/about/network/latency/), and in addition to this, there may be additional system delays associated with buffering, central servers, jitter buffers, software systems at the end points and hardware or low level audio subsystems. Even for a well-designed system, these additional latencies may add up to 100 ms plus whatever is required for the desired robustness to network jitter.

With such latency, it may be more likely that both parties will commence speaking within the one way delay time, and then the time taken for this to be realized and one or other parties to back off. This scenario may have an impact on 'natural turn taking' and causes delays, stutter and inefficiency in the communications flow.

In systems that allow for many parties to communicate simultaneously, often known as voice conferencing systems, as the number of parties increases, it is sometimes efficient in bandwidth to use a central server. There may be a cost associated with this, in that all packets are typically handled by this server, with scheduling, handling, processing and output delays.

SUMMARY

Several embodiments of digital data processing systems and methods of their manufacture and use are herein disclosed. Digital media communication systems and methods are disclosed in which a set of end points and/or clients are in communication with a set of servers. The system is capable of determining which end point is a dominant user and/or speaker. When the system determines that an end point is dominant, then the digital data that emanates from dominant end point is preferred. Such preferred digital data may be forwarded asynchronously and possible ahead of digital data from other, non-dominant end points. Synchronous and/or substantially contemporaneous digital data from other end points may be mixed that such that, when rendered, gives substantially the same effect as real life superposition of signals. The system may also toggle on or off between states of asynchronous forward and synchronous-only modes.

In one embodiment, a method for reducing latency within a digital media system is disclosed, said system further comprising a set of servers, at least one of said servers further comprising a buffer and said servers receiving digital data from a set of end points, the steps of said method comprising: determining at least one end points as dominant; indicating said digital data from said dominant end point is preferred; mixing synchronous digital data from end points not determined as dominant; and forwarding preferred digital data from said dominant end point asynchronously.

In another embodiment, a system for providing digital data communication is disclosed, said system comprising: a set of servers, at least one said server comprising a jitter buffer and said servers in communication with each other according to a desired topology; a set of end points, each said end points in communication with at least one said server and said end points inputting digital data into said system; a controller, said controller capable of determining which end point is dominant; wherein at least one of said servers capable of mixing synchronous digital data from end points not determined as dominant; and wherein further at least one of said servers capable of forwarding preferred digital data from said dominant end point asynchronously Other features and advantages of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIGS. 3 through 6A and 6B depict examples of synchronous and asynchronous processing of one embodiment of voice conferencing system.

DETAILED DESCRIPTION

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers. A component may also be intended to refer to a communications-related entity, either hardware, software (e.g., in execution), and/or firmware and may further comprise sufficient wired or wireless hardware to affect communications.

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Introduction

'Mouth-to-ear' latency is one metric of a communications system. When moving all traffic through a central server, there is typically a hop in the link, which can add additional latency and be a competitive disadvantage to some system designs. A typical business communications system may achieve mouth-to-ear latencies of the order of 150 ms. At this range, even 10 ms of reduction in latency may create an increase in 'Mean Opinion Score' for the call of 0.1-0.2 points. By comparison, this may compare with a doubling of the effort of pre-processing and audio quality conditioning.

In many of the embodiments described herein, systems and/or methods are disclosed that tend to allow, for at least one participant, a reduction in the mouth-to-ear latency of their communication to others in the order of 15-50 ms in each direction. In many such embodiments disclosed herein, it may be possible to allow the server to enter a mode and/or state, where at least one end point and/or client be identified as "dominant" and/or "preferred" and may have preferential treatment for its digital data (e.g., audio, video, any combination of audio and video or the like), possibly in the form of incoming packets to the system and/or servers, and those packets may be forwarded substantially immediately (e.g., as fast as possible) without employing deeper server inspection. Such forwarding may occur on an asynchronous basis—for example, forwarded outside of any queue of such digital data that may exist at any server or on the system. In one embodiment, servers may have sufficient controllers and database knowledge of the topology of the system—e.g., the interconnections of the various servers that comprise the system. In that fashion, packets may be forwarded on an automatic and intelligent basis that may consider factors, like least hop routing and/or scheme. In addition, schemes may be altered depending on other factors, such as network congestion considerations that might deviate from a least number of hop scheme. If at least one server does not have such a controller and/or database, a separate controller in communication with at least one server may suffice.

In other embodiments, it is possible to allow for the possibility of mixing of packets from different speakers and/or entities. In some embodiments, these different speakers may not be the dominant speaker at a given point in the conference call and/or conversation. The effect of mixing non-dominant speakers may be akin to (and may be rendered at other end points substantially as) the real life experience of superposition of real audio waves—e.g., the collective sounds that reach a listener's ear in a room where at least conversation is taking place. Such mixing of packets from different speakers may provide for a reduction in bandwidth. In one embodiment, packets from different end points may be mixed that are—while not possibly at the exact same time—then substantially contemporaneous with each other. Such conditions may be relaxed to within the tolerance of human aural and/or sensory perception—e.g., different packets from different times may be mixed, as long as there is no undesirable aural and/or other sensory perception of the mixed packets.

In addition, in some embodiments, this mode, or the dominant and/or selected user in a conference call may dynamically change over time, thus it may be desirable to modify other parts of the system and add some minimal meta data to packets transmitted by such a selected user so that the change in latency, and associated packet drop (when moving to direct relay mode) and insert (when moving back to synchronous server mode) may be handled gracefully and substantially without major changes to the end client jitter buffer.

In some embodiments, the change in forwarded packets may look like jitter at the final end point, and it may be desirable to flag some of the packets to attempt to avoid this, and allow a better reduction in latency. In some embodiments, actual and/or perceived latency may be reduced on at least one of the links in a multiparty conference call, and may achieve an increase in the opinion score or user experience without any significant increase in packet loss or system and audio quality performance.

In some embodiments, a conferencing system is described where the default action of the server is the combination or combined processing of several streams. In such a system, no audio tends to be dropped. In such a system, it may be desirable that the server be synchronous to a degree and line up incoming audio appropriately. In some embodiments, the system may provide a way to achieve the advantage of larger audio combination in the synchronous server, while allowing for a lower latency typical of the asynchronous and immediate forwarding approach, without causing complications in the stream continuity and estimation of network link latencies.

In certain embodiments, systems and/or methods are disclosed for combining the advantages of fast relay and the potential for complete scalable audio preservation in a large voice conferencing system. Specifically, several embodiments set out the mechanism for achieving an effective fast relay without significant impact to the existing server to manage the transition complexity and perceptual impact. The result may tend to be a reduction in interaction latency between selected end points, and may affect a method for determining the selected set of priority end points to be received as a fast relay by each end point across a conference. In this way, such systems tend to affect a dynamic structure to optimize link latencies, peak bandwidth and audio preservation.

A First Embodiment

Figure 1:
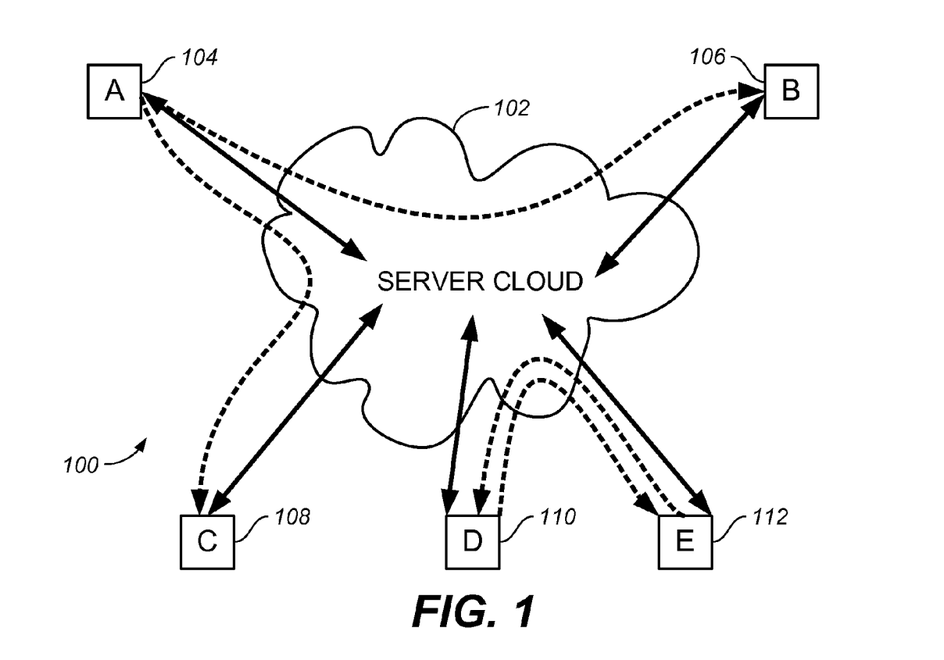
FIG. 1 depicts one embodiment of a typical environment and architecture of a voice conferencing system.

FIG. 1 depicts one possible environment 100 for a typical voice conferencing system. End points A, B, C, D and E (104, 106, 108, 110 and 112 respectively) may be engaged in a voice conference and the paths of voice communication may be routed through and/or via a server cloud 102 (which may also comprise the Internet). Individuals may be at these end points at disparate locations and may, for example, be talking into speaker-enabled sets at these location. Voice and other sounds at these locations may there be digitized and packetized in manners known in the art and sent across a server cloud 102. In one scenario, one end point (e.g. A, 104) may have—at this given point in time and in conversation—a dominant speaker that is carrying most of the relevant information from the standpoint of the purpose of the caller.

In addition, FIG. 1 shows a schematic of a possible combination of normal (server mixed or combined) media paths (e.g. solid lines), and a set of present priority forwarded paths (e.g. broken lines). It should be appreciated that the normal links are potentially bi-directional, and may not always be active. In one embodiment, the priority forwarded links, by comparison, may be single direction. As also depicted in FIG. 1, it may be desirable to affect the forwarded links as shallow paths in the server cloud—thus, avoiding multiple server hops and, as being priority, forwarded substantially immediately or as soon as possible. The normal links are deeper in the server cloud, and travel through one or more servers each with a possible alignment (jitter) buffer and combining or mixing with other streams. As such, the priority forward links should have lower propagation delay than normal media paths.

In one embodiment, it may be desirable to allow a server or multiple servers to enter a state—e.g., where at least one client may have preferential treatment for incoming packets, and those packets are forwarded immediately (as fast as possible) without deeper server inspection. Such states may be affected by a number of possible embodiments—e.g. by setting a bit or set of bits within packets emanating from such client or end point. Another possibility might be to use alternative (e.g. direct) signaling paths for the various servers—which may be desired in the design of dedicated voice conferencing systems. Other mechanisms for setting such server states are possible and the scope of the present application encompasses these other mechanisms.

In addition, it may be desirable to permit the possibility of mixing (as will be discussed further below). This mode, or the selected user in a conference call may change over time, thus it may be desired to modify other parts of the system and add some minimal meta data to packets transmitted by this user so that the change in latency, and associated packet drop (when moving to direct relay mode) and insert (when moving back to synchronous server mode) are handled gracefully and without major changes to the end client jitter buffer. The change in forwarded packets can look like jitter at the final end point, and it may be desired that the packets be flagged to avoid this, and allow a reduction in latency. In some embodiments, this decision and labeling may occur on the preferentially treated transmitting client.

It should be noted that the various embodiments and techniques may be applied beyond voice conferencing. Aspects of these various embodiments, system and/or methods may be applied to video and/or other collaborative media, such as virtual reality or game state data.

Server Modes

Many of the present embodiments may affect various server modes in order to affect reduction in latency. Two such modes of the server handling an incoming audio stream packet are described herein.

Synchronous Processing

In this server mode, incoming packets may be aligned with some network resilience, and then combined or mixed to produce output packets that are synchronously sent out to clients for use in a rendered scene. Additionally the server may perform some DSP operations on the media as it is combined to produce one or more output media streams sent to the destination. As will be described in greater detail below, one of the effects that such synchronous processes might bring is a digital version of signal superpositioning. As is experienced in real life, a listener will hear voice and other sounds contemporaneously and will use the position of superpositioning to comprehend the sounds received from multiple sources and make sense out of the signal.

Asynchronous Forwarding

In this server mode, an incoming packet may be forwarded substantially immediately to a client for appropriate use in the rendered scene. This mode may affect low latency, but if a single destination can hear many input sources at once then the number of packets and bandwidth of data streams sent to the destination can be significantly large and may not be easily handled by the remote client.

Pseudocode for the two different threads and associated event driven execution stages for a synchronous mix or combine, and a priority asynchronous forward. The following table provides some pseudocode for the two types of processing thread as they might run on a server in a possible embodiment:

TABLE 1

Pseudo Code for Synchronous Processing

Figure 2:
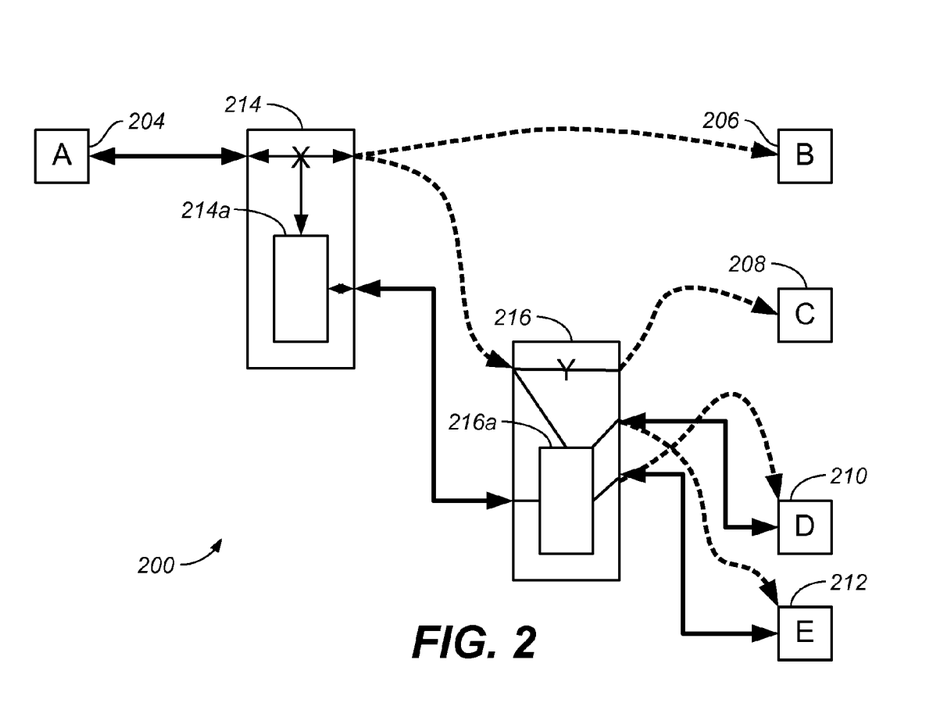
FIG. 2 depicts one example of processing in the voice conferencing system as depicted in FIG. 1.

1. Wait for Block Timer (20 ms)
2. Pull blocks from all jitter queues as desired
3. Combine or mix as desirable
4. Queue appropriate block or data for send Pseudo Code for Asynchronous Forwarding 1. As a packet arrives, do:
2. Check if it has a priority forward directive
3. Modify packet data as desirable
4. Immediately send (ahead of any queued send)
5. Add to appropriate incoming jitter queue FIG. 2 depicts one particular point in time for the voice conference, as proceeding and depicted in FIG. 1. In this example and specific instance, FIG. 2 shows two servers X and Y (214 and 216 respectively) and the paths in place for media routing. It should be noted that different endpoints may receive different sets of priority forwarded streams (as depicted by the dotted lines), and some priority forwarded streams may travel through more than one server, forwarding at each stage. Within servers X and Y, there may be an optional mixing block (214a and 216b respectively) wherein packets (or other suitable digitized quantities) may be synchronously mixed (as depicted by solid lines), as further discussed below. Packets, mixed or otherwise, may be queued and passed between end points or other servers. A variety of combinations are possible, as shown in FIG. 2—for example, packets sent to end points D and E may have been queued and mixed with other packets, and then forwarded on a priority basis.

Synchronous Processing Example

Figure 3:
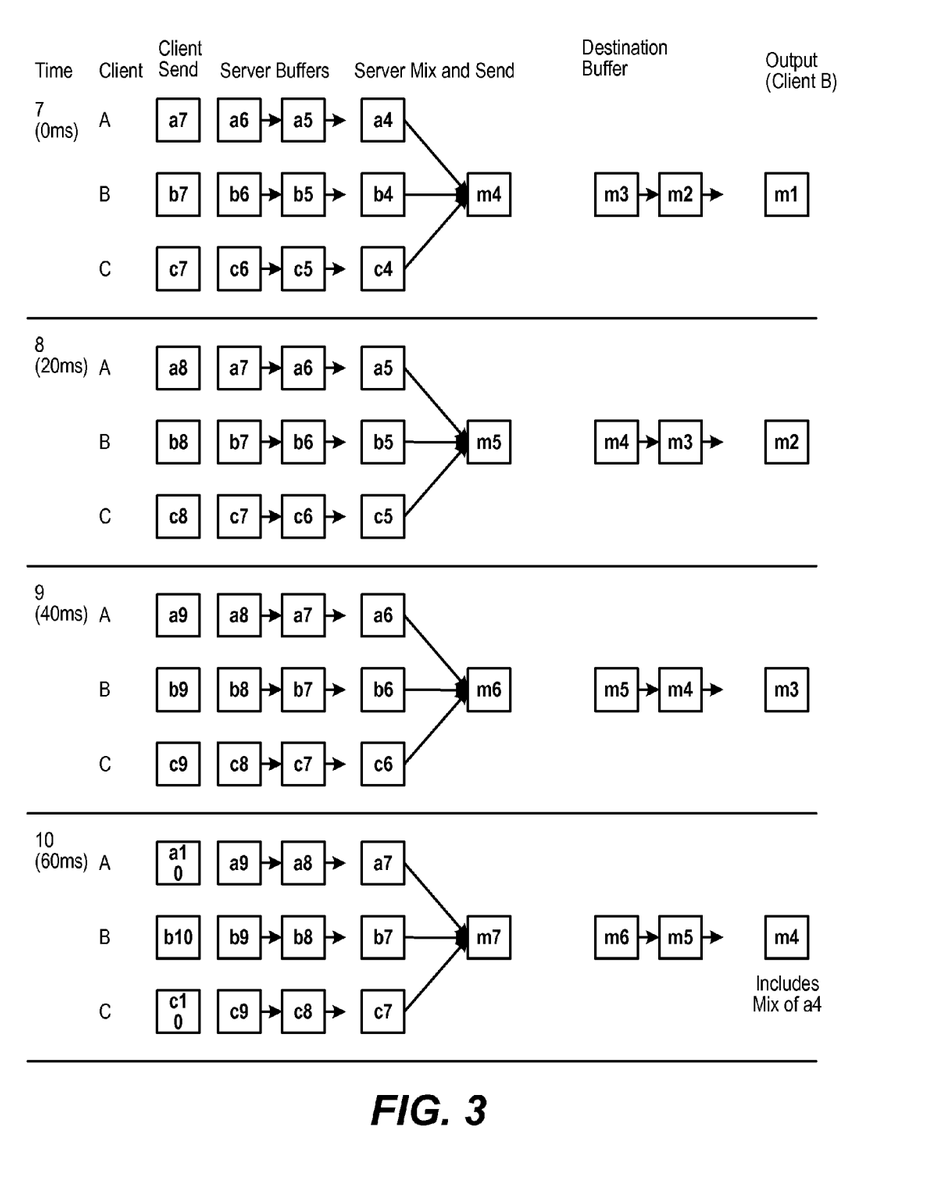

Consider a server where the operations are synchronous, and where it may be desirable to combine input from several clients as incoming audio or media streams. This example is depicted in FIG. 3. As shown, there are four rows, each row depicting the state of packets being sent or delivered over voice conferencing system—at a given point in time. Across each row, it is seen (in left-to-right fashion): the client, what packet the client is sending, server buffer, the mix of packets for sending, a destination buffer and the receipt of packets at a given client.

So, for example, it may be seen that at time slot 7 (at 0 ms), Clients A, B and C are sending packets a7, b7 and c7 respectively. The notation "a7" may have a plurality of meanings, one of which is that it is a packet originating from server A and that it is the seventh in a sequence of packets (or alternatively, serves as a timestamp) that might comprise a communication stream—or other possible signal.

It should be appreciated that in the following diagrams, no effective queue is shown for the network propagation delay. Without loss of generality, this may be considered to be zero and equal for all links. It is understood by those skilled in the art that such propagation links latencies are possible and likely and thus not considered as controllable latency in the detail of the time sequence shown.

In one embodiment, the streams from Clients A, B and C reach a server buffer and their packets may become queued.

Such a server may decide to mix the signal streams from Clients A, B and C, according to certain desired parameters. For example, perhaps it is decided by, or known by, the server that Clients A, B and C are not the dominant speaker at this point in time. In this case, it may be desirable to reduce overall bandwidth and mix substantially contemporaneous packets from these non-dominant speakers. This is depicted in FIG. 3 as packets (a4, b4, c4), (a5, b5, c5), (a6, b6, c6) are mixed to become packets m4, m5 and m6 respectively. These mixed packets may be sent to a destination server and/or client and placed on its buffer for output at a client. As depicted in this one embodiment, jitter buffers may exist on the server for all of the incoming streams. These are synchronously mixed and sent to the end client. Another jitter buffer may be present on this link. In this example, all streams have the substantially same effective latency.

In other embodiments, the identification of a dominant speaker may be a user input (e.g. a switch, toggle or the like) may be actuated by the speaker phone at the end clients. It may be possible for end users to capture the title of dominant speaker at certain points in the conversation—making the designation of dominant speaker to be dynamic and/or user-selected. In other embodiments, it may be possible for the system to perform some analysis of the packet streams (e.g. by sampling) and seeing which stream represents the more voice-rich content (as opposed to noise) and dynamically select a stream as the dominant speaker stream. In some embodiment, sampled digital data may be tested against a number of possible conditions. For example, testing energy or frequency content of packets may help to determine human speech (or other desirable information)—e.g., if a threshold condition is set and satisfied. In other embodiments, Voice or Signal Activity Detectors (VADs/SADs) may be employed to determine dominant speakers and/or end points. Such testing and detectors may be considered suitable conditions against which the sampled data may be assayed. If such conditions are satisfied, then at least one end point may be determined as dominant and/or preferred. It should be appreciated that this sampling and determining may be a dynamic feature of these embodiments. In fact, the selection and/or determination of a dominant end point and/or client may change many times over the course of a single voice and/or digital communication.

Packets from dominant speakers may be set and/or encoded with a bit or bits to indicate to the servers that these packets may receive special or priority routing or other treatment—as opposed to non-dominant speakers. Alternatively, there may be another signaling path by and/or between servers for priority processing. This may be more likely in a proprietary end-to-end voice conferencing system (as opposed to, e.g., ones that may make use of public or non-proprietary networks and/or servers, such as over the Internet). For example, a signal from some portion of the system (e.g., a server and/or controller that has knowledge of which end point is dominant and/or preferred) to other servers and/or controllers that packets from a given end point is dominant and/or preferred. Such bits or signals may also be used to inform the system as to which state and/or mode to enter to handle such dominant and/or preferred digital data. Different modes and states are discussed in greater detail herein.

Asynchronous Forwarding Examples

Figure 4:
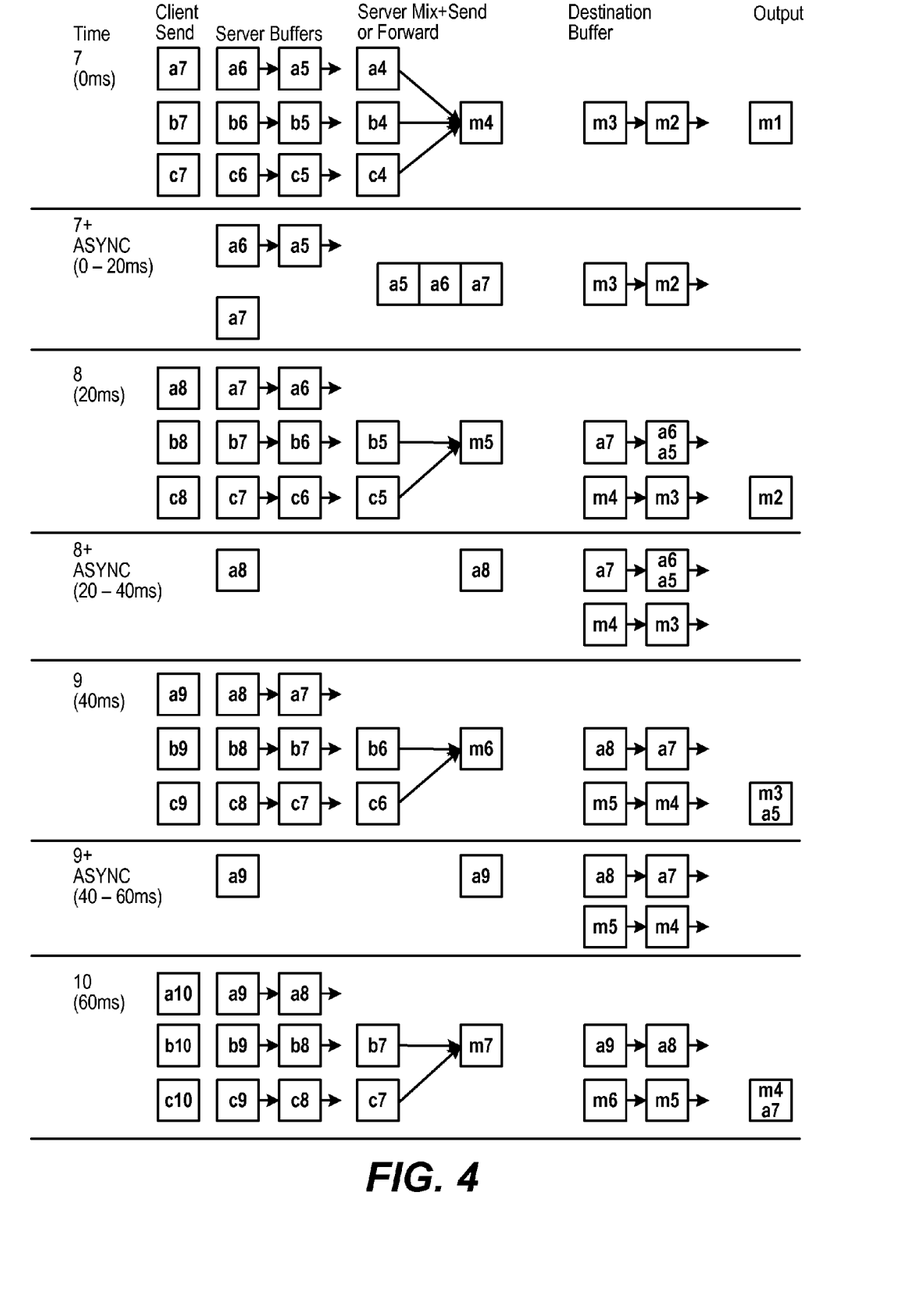

FIG. 4 depicts a situation whereby Client A has been (by some mechanism) designated a dominant speaker (or otherwise, deserving of priority treatment). Now, by allowing an asynchronous operation, it is possible to transition to the state of forwarding the data or packets for client A, even after some (or during) synchronous processing. As may be seen, time slot 7.0 (at time 0 ms) shows the same synchronous processing as in FIG. 3. However at time slot 7+ (from time 0-20 ms), it may be seen that asynchronous processing may commence with sending a5, a6, and a7 packets. In later time slots, it may be seen that at the client the asynchronously forwarded A packets may be mixed (e.g. a5 and a6) and queued separately from other mixed packets received from the server (e.g. m3, m4, m5 . . . ). As may be seen, packets from Clients B and C may continue to be mixed and sent normally by the server. If the cases where there are a limited number of ports to a given server, it is possible to mix priority packets, together with non-priority packets (not shown)—as all forwarded asynchronous packets are sent substantially immediately. Mixing of priority packets with non-priority packets would occur, for example, as sending a8 and m6 together in time slot 9 at 40 ms.

As shown in FIG. 4, after the first time slot, the server may begin immediate forwarding of the stream for A. This is then received at the end client using a separate jitter buffer. It can be seen that the approach leads to the audio from client A being advanced by three blocks at the output. As a result, there are three points at which audio from A is overlapped at the output and may be selected or dropped—because m3 and m4 already include a3 and a4.

Figure 5:
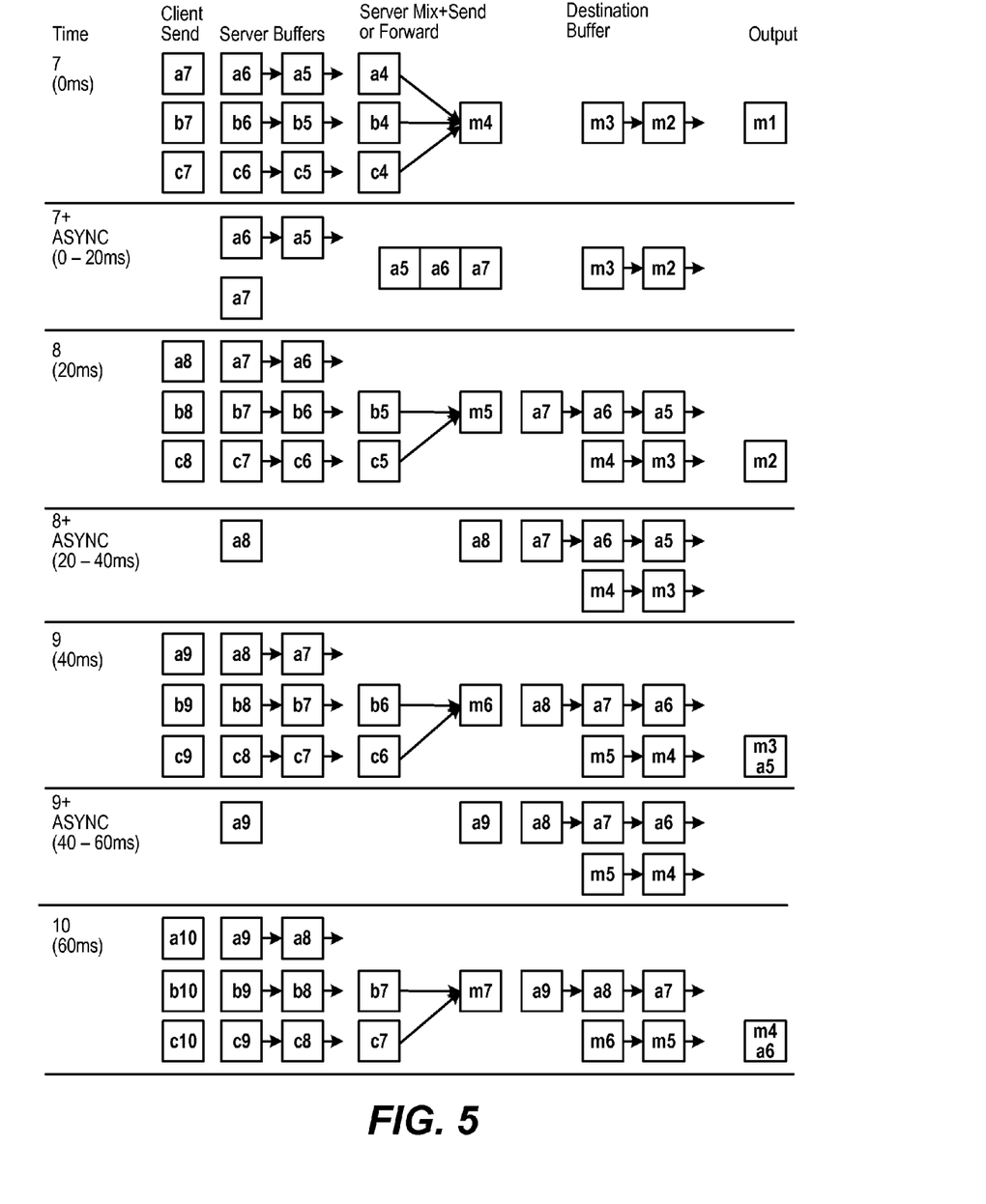

From FIG. 4, it may be seen that this approach creates a reduction in the latency from client A to the output. Since the final jitter buffer may now have to handle a larger jitter, FIG. 5 depicts one embodiment that may achieve a reduction in the advance for Client A. FIG. 5 depicts an exemplary time sequence for transition to asynchronous forwarding on the server—with an extension to the end client jitter buffer for the forwarded stream. In this example, the advance on the asynchronously forwarded stream is two blocks. Since the advance is reduced to two blocks, there are only two places where there is a potential overlap of audio from A.

In the previous examples, it is noted that the potential reduction in latency of three blocks (e.g., FIG. 4) is comprised of two blocks from the server jitter buffer which is avoided, and another block due to the asynchronous processing of the forwarding. For the example block size of 20 ms, this could represent a 60 ms user link latency reduction.

In one embodiment, it is possible to use a separate jitter buffer at the end client. However, since the audio may be output as synchronous blocks anyway, it may be reasonable to combine the two jitter buffers. A lower latency may be achievable by keeping them separate by maximizing the effective jitter buffer achieved for the stream from A.

In the previous figures, it is noted that as the audio from A is advanced, there may exist some overlap or duplication as older audio exists in the mixed blocks received at the end client—at the same time as audio is received forwarded directly. In the figures shown, at the commencement of forwarding, the server may send additionally the contents of the jitter buffer. Although this may be optional, however sending it may provide the ability for the client to either select an appropriate subset of the audio, or 'double over' the previously mixed audio from A to avoid any information loss. Generally, the transition may occur at a favorable time (e.g., when the audio activity is low).

In the case when the system switches to relay mode, there are many possible embodiments as to how to handle the contents of the jitter buffer to a client. In one embodiment, the server may just start forwarding from the new and advanced packet. This means the client may see a skip over of a few packets (e.g., an effective early arrival). As it may be notified of this change, the client may just stitch it in and cut the audio in between what is in its jitter buffer and the forwarded buffer.

In another embodiment, the server may additionally send the jitter buffer contents. While this may represent a bigger data set, the client may then select how to best stitch the audio with more data available.

In embodiments where the additional data is sent in the jitter buffer, the client may select which set of packets to render. This selection may be based on gaps in the audio, loudness, or other audio features such as event detection and perceptual significance—and may either be user-selected or automatically selected depending on information retrieved from sampling packets or other signaling protocols.

In other embodiments, the system may elect to forward a packet immediately, or add it to the next packet that is heading out to the associated client. Generally, the client may be receiving and rendering synchronously, in which case it may make no substantial difference to latency. Both embodiments may be suitable. Sending it right away may give some reduction in latency and/or jitter and network resilience (e.g., splitting the data sent to the client); while attaching it to the next immediate output packet to that client may tend to lower the peak and overall output packet count (which, for small packets such as with VoIP, this may be a limiting factor).

When the system is forwarding, it is noted that the incoming stream may still be in use for other clients who may not be set to receive this audio data as a forwarded packet. In such cases, the incoming jitter buffer for this stream should continue. In some embodiments, where this stream is not needed locally, the jitter buffer may be terminated to save resources. For exemplary purposes, the jitter buffer on the server is shown as continuing in FIG. 4 and FIG. 5—even though it is not being used. It is also noted that continuation of the jitter buffer may be desired for the point that the server returns to synchronous processing of the stream.

Transitioning Back to Synchronous Processing or Mixing

To transition back to a synchronous mode (or any other mode not employing asynchronous forwarding), one possible result may be a jump to a longer delay of the particular stream at a receiving client. Similar to the transition to forwarding, it is possible to select the time to do this, and use appropriate means to conceal (or otherwise affect) the transition. The additional jitter buffer at the client may be terminated and flushed out, and the server returns to mixing the transitioned stream back into the mix being sent to the client—or any other mechanisms of sending such streams.

Figure 6A:
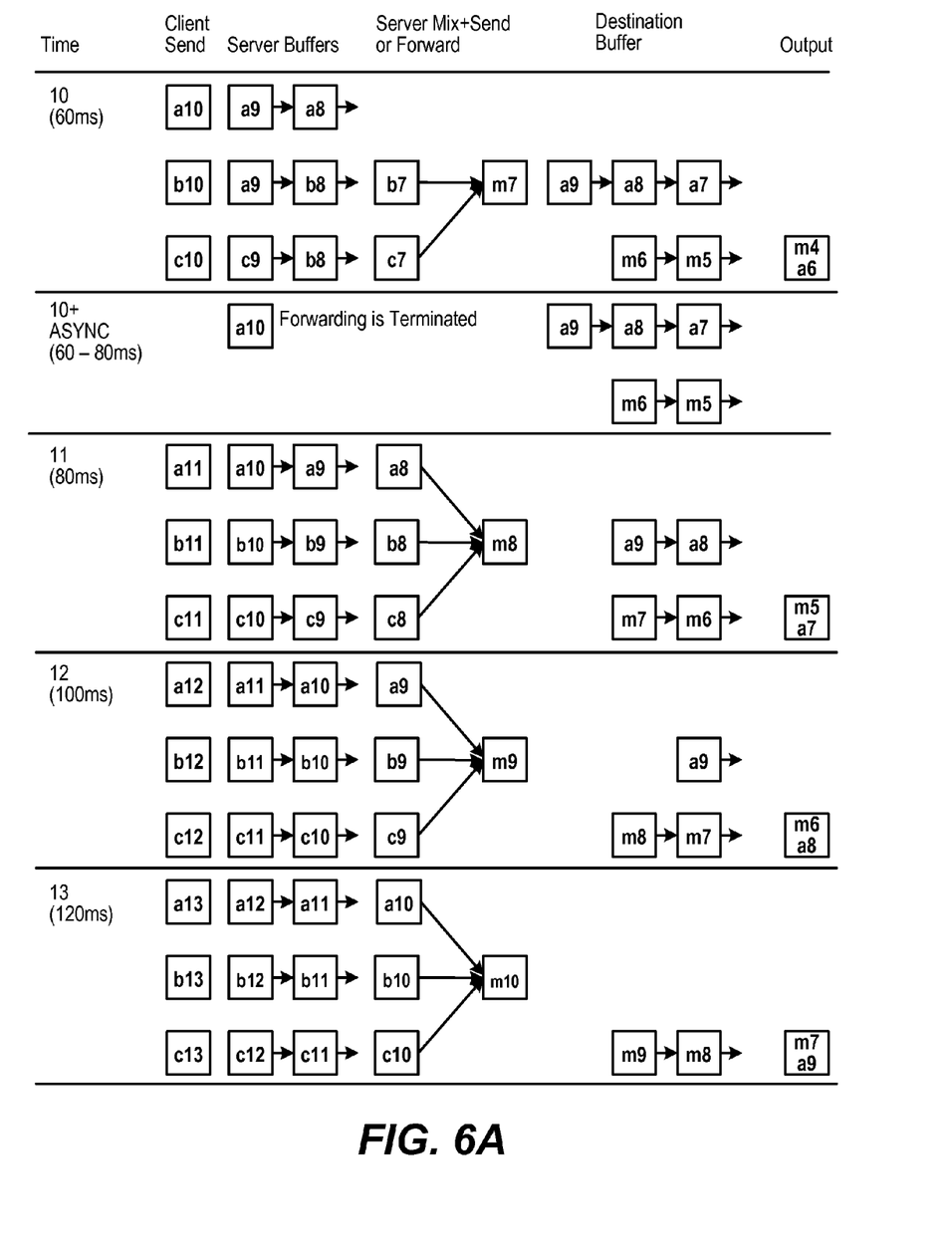
Figure 6B:
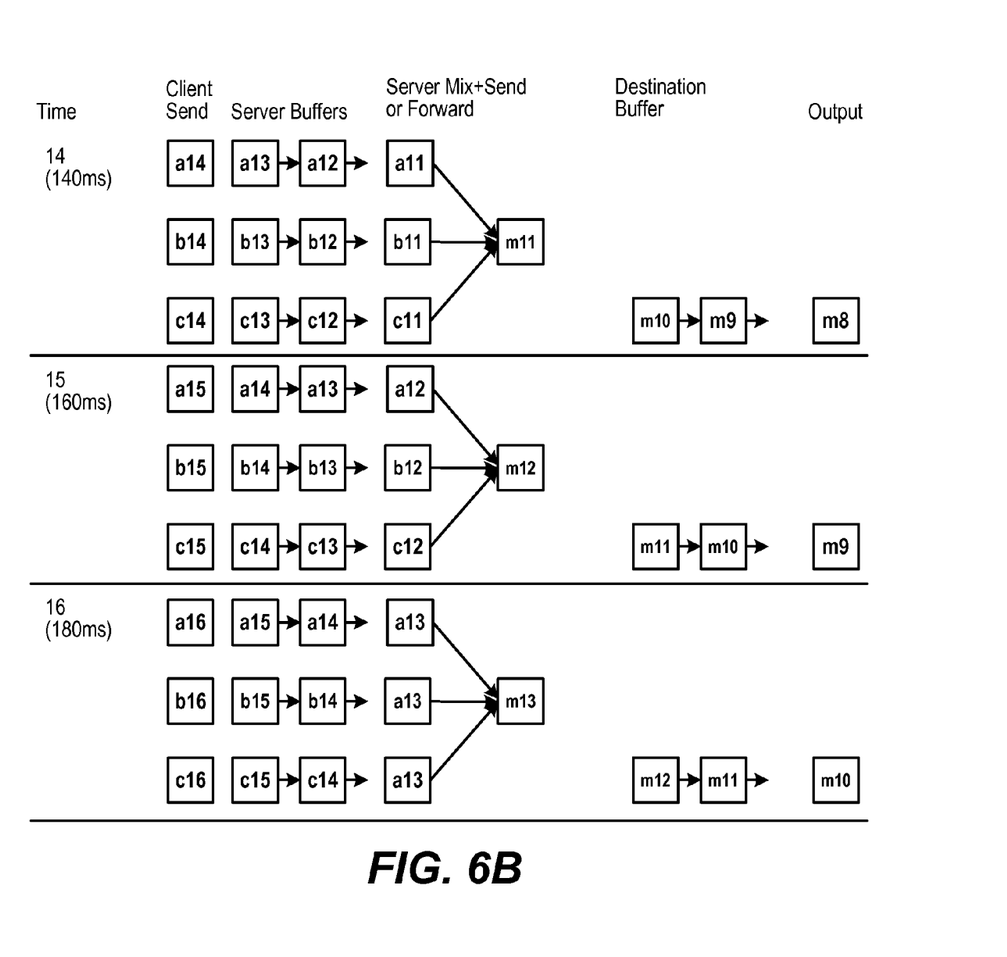

FIGS. 6A and 6B depict one such embodiment for transitioning back to synchronous processing or mixing on the server. FIGS. 6A and 6B pick up the scenario and sequence as shown in FIG. 5. It may be noted that since the audio from A is effectively delayed a further two blocks in the process, it may be desired to repeat or zero pad the effective stream of A. A repeat may be achieved on the client, while a pad may be achieved by delaying the mix of A into M by a further two blocks.

Decision and Timing on Transitions

As was mentioned, there are many embodiments and mechanism for the selection of a dominant speaker or otherwise identifying end clients to which the system might give preferential treatment. It should be noted that it may be desirable to reduce the latency in the dominant or between dominant parties in a conference. It should be appreciated that, as shown in FIG. 1, each receiving client can have one or more preferred endpoints from which it may receive priority forwarded data. In this way, several embodiments may be seen to implement a greater number of scenarios than just the forwarding of a particular incoming data stream, but rather choose to forward a given incoming stream to a particular receiving client. It is noted, that in such an approach, it may be desirable to reduce the effective latency between certain receivers and sources of media, and this may tend to reduce the possibility of the priority receiving end point from engaging or commencing a transmission once the priority source end point has commenced.

As mentioned above, the selection of a preferred and/or dominant end client may be made by the users of the system itself. A switch or toggle (either actual or in software) may be used to indicate which speaker is the dominant one or which client is sending any time-sensitive data. This may be akin to a "talking stick" protocol—in which the one so selected has the "stick" and others are muted, or at least their packets are not designated as prioritized.

In other embodiments, the system may be able to automatically select such end clients with some sampling of packets or sampling of use patterns. In one embodiment, it may be possible to maintain a set of speech percentages at the server or some other supervisor. These may be statistics gathered over time—with a memory feature. In other embodiments, it may be desirable to designate the N-most dominant speakers in a conference for forwarding or other preferential treatment. It will be appreciated that any suitable mechanism for determining one or more end points and/or clients are preferred to the system will suffice for the purposes of this present application.

In some embodiments, it may be possible to use pre-processing labeling and/or other perceptual cues for deciding when to change preferred end clients. In some embodiments, it may be desirable to make use of hysteresis in making changes or switching modes or preferred clients.

Many use examples also give indications of other embodiments. For example, if the system is forwarding a set of streams—and suddenly a lot of people talk—there may be some mechanisms that may avoid bandwidth peak loads. For example, when there is a sudden peak in speech activity, it may be desirable to mask any delay gap in forwarded streams. In addition, it may be desirable to delay the other parties in order for it so sync up.

In some embodiments, the decision to forward to some client may be based on what they are receiving. Thus, the server may forward and buffer the same stream—hence the design where jitters keep going. For example, if each receiving end point allowed N=2 priority forwarded streams, the system could have two main people kept at low latency (both directions) and at least one person possibly interjecting may also be kept at low latency. That is, since each end point does not need to be forwarded its own media stream, the present system suggests that with N=2, a three way conference or conversation dominated by three parties could achieve a mutually reduced latency between those three active parties.

Once a set of end points and/or clients are determined to be dominant (and such determination may be changed over time and possibly in real time), then any digital data (e.g., audio, video or the like) received by the system and/or a server may be received. As described here and elsewhere in this application, once received, such digital data may be indicated as being "preferred". Such an indication and/or setting may be set or delivered in any suitable manner—e.g., setting bits within packets from such preferred end points and/or clients, using a signaling path by and between servers or the like.

Signaling and Operation

When a stream is passed on using the asynchronous forwarding mode, it may be desirable to indicate this to the client, other clients and/or servers in the system. In one embodiment, it is possible to send a flag indicating the asynchronous forwarding. It may also be desirable to send some information regarding the jitter characteristics on the network link to the server on the incoming path. The flag may be affected by allocating and/or dedicating some bits with individual packets of data; or there may be a separate signaling path (either directly or indirectly) between servers and/or end points. This last embodiment may be desirable in a full proprietary system or even if a substantial subset of the system is proprietary.

In one embodiment, the flag may be a simple 0 for normal, and 1 for asynchronous forward. When this flag is 1, an additional two bit field may be used to indicate the number of blocks that were in the server jitter buffer. This may also indicate the timing advance expected on this stream at the time of forwarding. In one embodiment, the server jitter buffer may be adaptive, and give some indication of the jitter on a part of the link. While this information may be desired at the transition to asynchronous forwarding (or a return to synchronous mixing or combination), it may be desirable that the system be robust to packet loss, and in one embodiment the data may be repeated in each packet for a desired period of time around (i.e., before or after) a transition (e.g., for 20 ms packets this is a 150 bps overhead in the forwarded case).

Impact to Online Jitter Estimation

In several embodiments, it may be desirable to continually estimate the network condition and the associated packet arrival jitter in order to optimally manage the size, over-run and under-run conditions of the jitter queue. In one embodiment, the system may monitor the forwarded flag for any change in state, and update the expected arrival times in each queue accordingly.

Latency Saving Analysis

Figure 7:
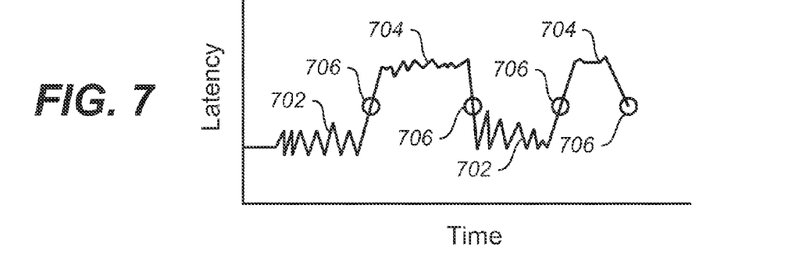
FIG. 7 is a graph depicting the latency from mouth to receipt of packet at end client, as it may vary when switching processing modes from periods of asynchronous processing to and from synchronous only processing.

FIG. 7 is a graph of the latency experienced from mouth to end point packet receipt on the vertical axis, versus time on the horizontal axis in a system that is toggling (706) between (ON and/or OFF) modes and/or states including periods of asynchronous processing (702) before transitioning to only synchronous processing (704). It may be seen that, in the asynchronous sections, the overall latency is lower than in the synchronous-only sections; however, the variance in the latency (i.e., the jitter) is higher during asynchronous processing. In addition, FIG. 7 depicts the different mouth to end point packet receipt latencies over time that may occur when a system with two equal link latencies is processing asynchronously or synchronously-only. During asynchronous operation, it can be seen that the latency is low, but the variance in latency (the jitter) is high. In synchronous-only operation, the latency overall increases, but the nature of processing reduces the jitter.

It should be noted that the jitter buffer employed on combining two hops (with asynchronous forwarding) may not be the sum of the jitter buffer length present on each link. Since the jitter buffer is employed to achieve a high coverage (or small loss), it sits in the tail of the distribution.

For a Gaussian distribution, it is possible to show that this may result in a reduction in jitter buffer from 2 to 1.41 for two links of equal jitter—a potential reduction of 60% of one of the jitter buffers in latency. This may be inferred by adding the variances for Gaussian distributions; and thus, the standard deviation tends to increase with the RMS of the link delay standard deviations.

Figure 8:
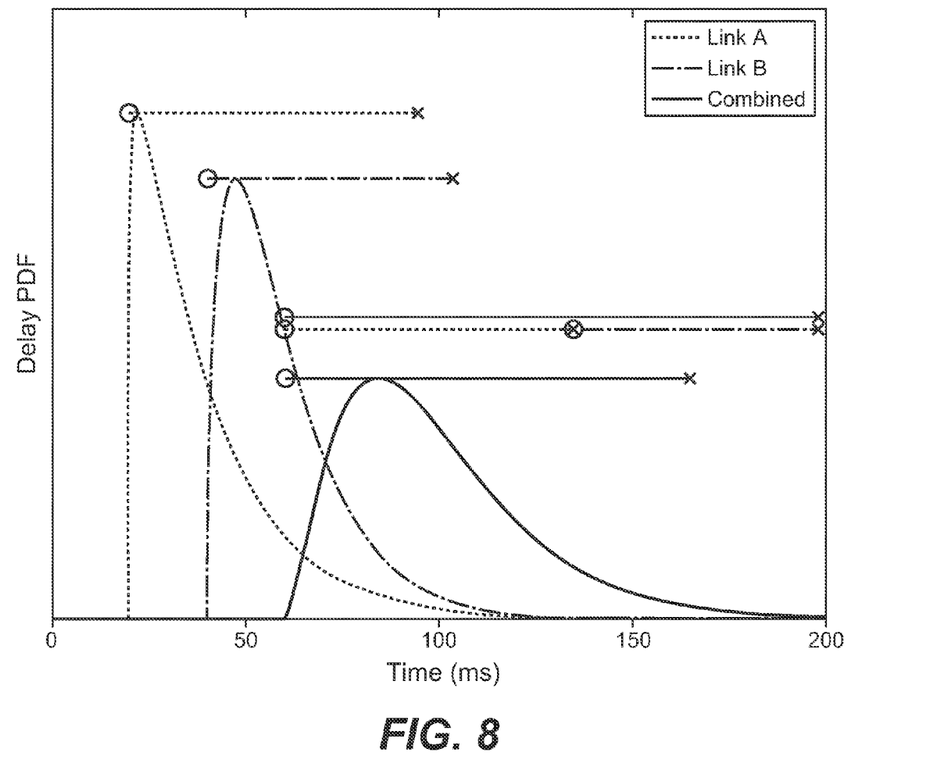
FIGS. 8 through 10 depict latency in a voice conferencing system comprising multiple jitter buffers.

FIG. 8 depicts one example of the concatenation of two links and the resulting latency and jitter. The bulk latencies add, however for an equivalent packet loss resilience, the resultant jitter buffer (solid line) is around 35 ms less than the combined jitter and delay length. The jitter buffers are specified against the transmission delay for a 2% packet loss.

Figure 9:
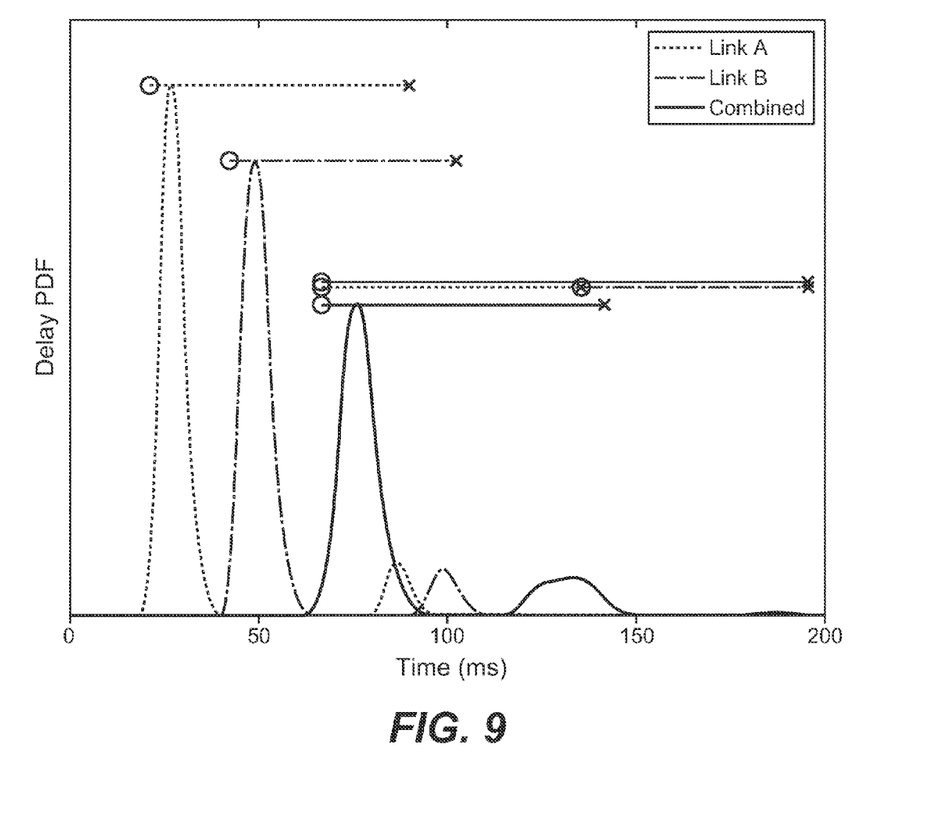

FIG. 9 depicts a second example of the concatenation of two links demonstrating the effect of bimodal distributions where each link has some probability of a bulk delayed arrival. In this case, there is a probability of 10% of a 50 or 60 ms delay typical of some wireless links. Where the bulk delay on the links is independent, a substantial savings in latency may be achieved, approaching the complete length of the smaller jitter buffer in the normal transmission path.

Figure 10:
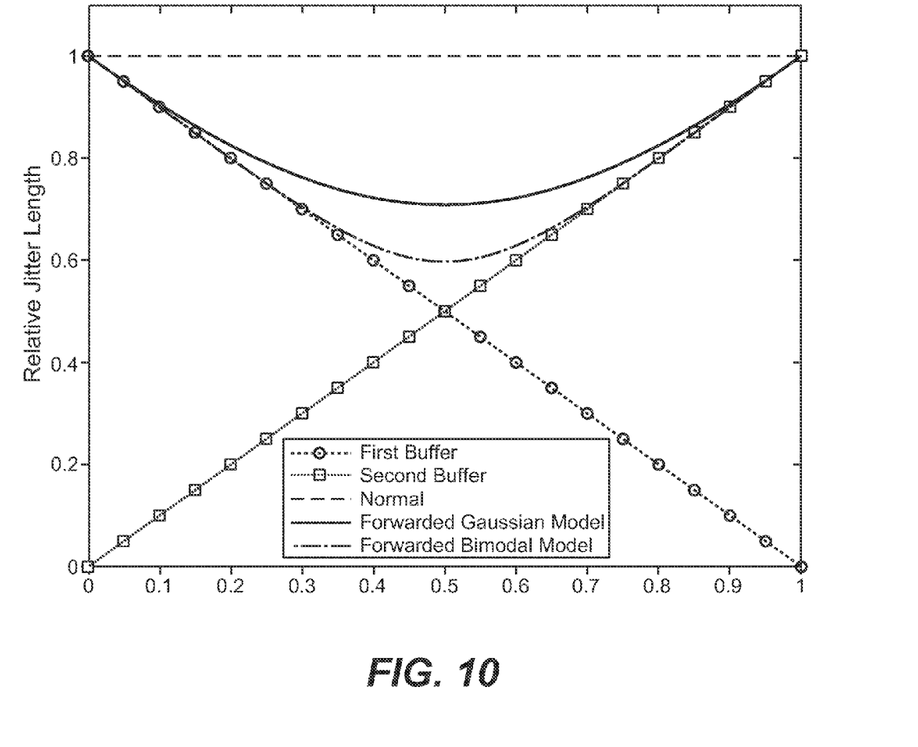

It should be noted that the change in latency may depend on the jitter on each of the links in use. In the case where one link has much larger jitter than the other, there may be less huge benefit. In fact, if the two jitter buffer lengths are considered as a fraction of the total jitter buffer (or associated network jitter), then FIG. 10 depicts a representative of the savings that may be possible. FIG. 10 further illustrates the potential benefit from asynchronous forwarding compared to synchronous processing on the server. It may be desirable to design the system such that the link jitter profiles are similar.

In yet another embodiment, the jitter buffer on the server may be a fixed length. As such, forwarding to the client can provide improved resilience for the forwarded stream.

In some embodiments, the system can learn what an appropriate estimate of jitter is over time for the combined link—and the system might be able to take into account any correlation that may exist between the two. If the correlation is high, then it may not be worth the forwarding.

Other Embodiments

In other embodiments, it is possible for the system to consider a plurality of states that it finds itself in and adjust its processing accordingly. For example, a first state ("State A") might be described as: when the conference server is sending a multimedia stream with only a single contributor. In this state, the system may relay the data substantially immediately along with information about network jitter. The client may compensate for jitter and store the additional information.

A second state ("State B") might be described as: when the conference server is sending a multimedia stream with multiple contributors. In this state, the system may compensate for jitter on all incoming streams. In addition, the system may combine the incoming streams into a single stream and send it to the client. The client may handle jitter compensation for the incoming stream.

In transitioning between these states, the system may adjust itself as follows. A first transition ("Transition C") may be described as: when the conference server is sending a multimedia stream with multiple contributors, and determines that the stream will become a stream with a single contributor. In this case, the system may send to the client relevant jitter compensation information (e.g., buffered stream data, timing and the like). The client may then adjust its jitter compensation according to the new jitter compensation information (e.g., by increasing its buffers appropriately). From this point on, the participants will operate in state A.

A second transition ("Transition D") may be described as: when the conference server is sending a multimedia stream with a single contributor and determines that the stream will become a stream with multiple contributors. In this case, the system may compensate for jitter on all incoming streams, combine the streams and then send them, along with timing information allowing the client to insert the new stream at an appropriate time. The client may insert the data into the appropriate place in its stream, and adjust its jitter compensation (e.g., by shrinking its buffers appropriately).

It may be appreciated that that during transition C, the data rate to the client may increase, because data delivered in state A may arrive at the client with lower latency than in state B, effectively causing a time shift. The system may seek to minimize the impact upon the rendered media stream. This may be achieved by a variety of methods and mechanisms, such as selectively dropping incoming media, altering playback rate or selecting appropriate times in the media to change state (e.g, during silence or inactivity).

During transition D, the data rate to the client may decrease, because data delivered in state B may arrive at the client with a higher latency than in state A, causing another time shift. The system may seek to minimize the impact upon the rendered media stream, which may be achieved by algorithms for concealing missing multimedia data, such as rate changes or repetition, or by selecting appropriate times in the media to change state (e.g., during silence or inactivity).

In one embodiment, it is possible to conceal transition D. In this case, the system may be allowed to switch states before doing any mixing and deliberately add latency to the extra media sources. In this case, this may be accomplished before the other sources actually contribute. In this case, the system would effectively conceal between two media segments that would be similar to each other (e.g., two frames of a single speaker in the middle of a speech burst, or two frames of a video stream)—instead of trying to conceal from a frame of one speaker and a frame with more than one. Then the system may gradually catch everyone up using whatever method desired.

In other embodiments, it may be possible to select and/or set preferred forwarding paths to reduce latency between said preferred end point and at least one non-preferred end point where the cost of contention and/or erroneous simultaneous transmission is either determined to be high—e.g., by monitoring traffic or by modeling.

A detailed description of one or more embodiments of the invention, read along with accompanying figures, that illustrate the principles of the invention has now been given. It is to be appreciated that the invention is described in connection with such embodiments, but the invention is not limited to any embodiment. The scope of the invention is limited only by the claims and the invention encompasses numerous alternatives, modifications and equivalents. Numerous specific details have been set forth in this description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The invention claimed is:

1. A method for reducing latency within a digital media system, said system further comprising a set of servers, at least one of said servers further comprising a buffer and said servers receiving digital data from a set of end points, the steps of said method comprising:
   determining at least one end point as dominant;
   indicating said digital data from said dominant end point is preferred;
   mixing synchronous digital data from end points not determined as dominant;
   putting the synchronous digital data in a queue; and
   forwarding said preferred digital data from said dominant end point asynchronously, said forwarding comprising forwarding said preferred digital data from said dominant end point outside of the queue.

2. The method of claim 1 wherein said step of determining at least one endpoint as dominant further comprises the step of:
   sampling digital data from said set of end points; and
   determining at least one dominant end point depending upon the satisfaction of a condition and further comprises the step of satisfying one of a condition, said condition being one of a group, said group comprising: a condition of energy, a condition of frequency, a condition set by a voice activity detector and a condition set by a signal activity detector.

3. The method of claim 1 wherein the step of mixing synchronous digital data from end points not determined as dominant further comprises the step of:
   mixing packets from different end points that are substantially contemporaneous.

4. The method of claim 3 wherein the step of mixing packets from different end points that are substantially contemporaneous further comprises the step of:
   mixing packets from different end points that are renderable as a superposition of audio signals.

5. The method of claim 1 wherein said step of forwarding preferred digital data from said dominant end point asynchronously further comprises the step of:
   forwarding preferred digital data from said dominant end points in a least hop scheme.

6. The method of claim 5 wherein said forwarding preferred digital data from said dominant end points in a least hop scheme further comprises:
   modifying said least hop scheme depending on network congestion.

7. The method of claim 1 wherein said method further comprises the step of:
   toggling the step of forwarding preferred digital data from said dominant end point asynchronously, wherein said step of toggling the step of forwarding preferred digital data from said dominant end point asynchronously further comprises:
   continuing mixing synchronous digital data when said step of forwarding preferred digital data is toggled off.

8. The method of claim 1 wherein said step of forwarding preferred digital data from said dominant end points ahead of queued packets further comprises the step of:
   sending a flag to indicated that the digital data is preferred.

9. The method of claim 8 wherein said step of sending a flag to indicate that the digital data is preferred further comprises the step of:
   sending the flag via a signaling path between one of a group, said group comprising: a set of servers and a set of servers and clients.

10. The method of claim 8 wherein said step of sending a flag to indicate that the digital data is preferred further comprises the step of:
    sending the flag via a set of dedicated bits within digital data packets, wherein said step of sending a flag to indicate that the digital data is preferred further comprises the step of:
    sending information regarding the jitter characteristics on the network link via a set of dedicated bits within digital data packets.

11. The method of claim 10 wherein said step of sending information regarding the jitter characteristics on the network link via a set of dedicated bits within digital data packets further comprises the step of:
    indicating the number of blocks in the server jitter buffer.

12. The method of claim 10 wherein said step of sending information regarding the jitter characteristics on the network link via a set of dedicated bits within digital data packets further comprises the step of:
    indicating the timing advance expected on the stream.

13. The method of claim 1 wherein said step of forwarding preferred digital data from said dominant end points ahead of queued packets further comprises the step of: sending repeat packets for a desired period of time around the time of a transition between asynchronous forwarding and synchronous-only processing.

14. A system for providing digital data communication, said system comprising:
- a set of servers, at least one said server comprising a jitter buffer and said servers in communication with each other according to a desired topology, wherein said set of servers is in communication with a set of end points, and each said end points in communication with at least one said server and said end points inputting digital data into said system;
- a controller, said controller capable of determining which end point is preferred;
- wherein at least one of said servers capable of mixing synchronous digital data from end points not determined as preferred; and
- wherein further at least one of said servers capable of putting the synchronous digital data in a queue; and wherein further at least one of said servers is capable of forwarding preferred digital data from said preferred end point outside of the queue.

15. The system of claim 14 wherein said controller is capable of toggling the step of forwarding preferred digital data from said dominant end point asynchronously, wherein said controller is capable of continuing mixing synchronous digital data when said step of forwarding preferred digital data is toggled off.

16. The system of claim 14 wherein said controller is capable of sending a flag to indicate the digital data is preferred, wherein said controller is capable of sending repeat packets for a desired period of time around the time repeat packets for a desired period of time around the time of a transition between asynchronous forwarding and synchronous-only processing.

17. A method for reducing latency within a digital media system, said system further comprising a set of servers, at least one of said servers further comprising a buffer and said servers receiving digital data from a set of end points, the steps of said method comprising:
- determining at least one receiving endpoint as having a preferred path from a source endpoint;
- indicating said digital data from said source end point is to be conveyed to said receiving endpoint as preferred;
- mixing synchronous digital data from end points not determined as preferred;
- putting the synchronous digital data in a queue; and
- forwarding preferred digital data from said preferred source end point to said receiving end point asynchronously, said forwarding comprising forwarding preferred digital data from said dominant end point outside of the queue.

18. The method of claim 17 wherein said step of forwarding preferred digital data from said preferred source end point to said receiving end point asynchronously further comprises setting preferred forwarding paths to reduce latency between said preferred end point and at least one non-preferred end point where the cost of contention is substantially high.

* * * * *